United States Patent
Vogler

Patent Number: 5,464,245
Date of Patent: Nov. 7, 1995

[54] SUSPENSION FOR LIGHT DUTY TRUCKS

[75] Inventor: Richard G. Vogler, Naperville, Ill.

[73] Assignee: The Boler Company, Itasca, Ill.

[21] Appl. No.: 287,203

[22] Filed: Aug. 8, 1994

[51] Int. Cl.$^6$ ................................................. B60G 11/02
[52] U.S. Cl. ............................................ 280/720; 280/712
[58] Field of Search ............................... 280/688, 718, 280/720, 711, 712; 267/31, 52

[56] References Cited

U.S. PATENT DOCUMENTS

| | | | |
|---|---|---|---|
| 3,231,258 | 1/1966 | Brownyer et al. | 280/712 X |
| 3,309,107 | 3/1967 | Chieger | 280/124 |
| 3,334,913 | 8/1967 | Margala | 280/104.5 |
| 3,730,548 | 5/1973 | Thaxton | 267/31 X |
| 3,730,550 | 5/1973 | Thaxton | 267/31 |
| 3,785,673 | 1/1974 | Harbers, Jr. et al. | |
| 3,861,708 | 1/1975 | Fier | |
| 4,099,740 | 7/1978 | McGee | 280/678 |
| 4,397,478 | 8/1983 | Jensen et al. | 280/718 |
| 4,494,772 | 1/1985 | Smith | 280/712 |
| 4,566,719 | 1/1986 | Denberg | 280/711 |
| 4,598,930 | 7/1986 | Smith | 280/712 |
| 4,699,399 | 10/1987 | Jable et al. | 280/680 |
| 4,711,465 | 12/1987 | Raidel | 280/712 |
| 4,856,812 | 8/1989 | Stephens et al. | 280/711 |
| 4,919,399 | 4/1990 | Selzer et al. | 267/31 |
| 4,993,729 | 2/1991 | Payne | 280/704 |
| 4,998,749 | 3/1991 | Bockewitz | 280/712 |
| 5,024,462 | 6/1991 | Assh | 280/712 |
| 5,046,752 | 9/1991 | Stephens et al. | 280/711 |
| 5,217,248 | 6/1993 | Reast | 280/718 |
| 5,228,718 | 7/1993 | Kooistra | 280/678 |
| 5,271,638 | 12/1993 | Yale | 280/712 |
| 5,346,247 | 9/1994 | Snyder | 280/720 X |

Primary Examiner—Mark T. Le
Assistant Examiner—Peter M. Poon
Attorney, Agent, or Firm—Lockwood, Alex, Fitzgibbon & Cummings

[57] ABSTRACT

A conventional form of vehicle axle suspension comprises on each side of a vehicle-a leaf spring pack and a shock absorber system. A height control system may also be included. According to this invention the leaf spring pack is replaced by a single leaf spring and a pair of air springs. The opposite ends of the single leaf spring are shackled to the existing shackle attachments and their vehicle frame mounts. Midway between its ends the single leaf spring is connected to the adjacent axle end by the existing spring-to-axle attachment components. In order to compensate for the difference in thicknesses of leaf spring pack and the single leaf spring at their midpoints, a spacer having a vertical thickness equal to the difference in the thicknesses is mounted on top of the single thickness spring at the axle. Air spring support brackets are symmetrically mounted on the chassis frame member on opposite sides of the axle. The upper end of each air spring is attached to one of the brackets and the lower end of each air spring is attached to the single leaf spring. Preferably a-height control system is provided on each side so as to maintain the chassis at a predetermined level. Except for the single leaf spring and the spacer, the other components may be of the type used in conventional leaf spring pack suspensions.

8 Claims, 1 Drawing Sheet

SUSPENSION FOR LIGHT DUTY TRUCKS

BACKGROUND AND DESCRIPTION OF THE INVENTION

This invention relates, generally, to suspensions for light duty trucks and similar vehicles. The suspensions make use of four air springs and two single leaf springs together with shock absorber systems. More particularly, the invention relates to such suspensions which will replace conventional vehicle axle suspensions of the type combining a leaf spring pack and a shock absorber system mounted on and below a fore-and-aft extending chassis frame member on each side of a vehicle, and with each leaf spring pack and its shock absorber system being attached to the adjacent end of an axle.

A suspension of the present invention can either be installed as original equipment on a vehicle such as a light duty truck or it may be installed to replace a conventional leaf spring pack and shock absorber system. In either case, the suspension of the present invention is unique in that it makes maximum use of (1) certain existing or already in place components used in a conventional vehicle axle suspension of the type combining a leaf spring pack and a shock absorber system and (2) existing air springs and related components which are standard in suspensions of the type that utilize air springs.

In the suspensions of the present invention single leaf springs provide the primary support for the load due to the empty vehicle and resist side thrusts and driving and/or braking torque end thrusts applied from the vehicle's axle. The four air springs provide the primary support for the portion of the total load which exceeds the load due to the vehicle when empty.

In view of the foregoing summary of the invention, it will be seen that the object thereof, generally stated, is the provision of a suspension for light weight trucks and similar vehicles that makes maximum use of conventional and standard components and known vehicle suspension designs and technology to provide a new, low-cost suspension system for light duty trucks and the like that addresses the user's concern for a softer ride through the entire range of empty and loaded vehicle conditions.

A further object of the invention is to incorporate in the suspensions new known height control systems which provide a constant ride height thereby requiring less rear wheel to fender clearance and permitting easier headlight aiming.

Certain other objects of the invention will be apparent to those skilled in the art from the following detailed description of the presently preferred embodiment taken in conjunction with the accompanying drawings wherein:

Figure 1:
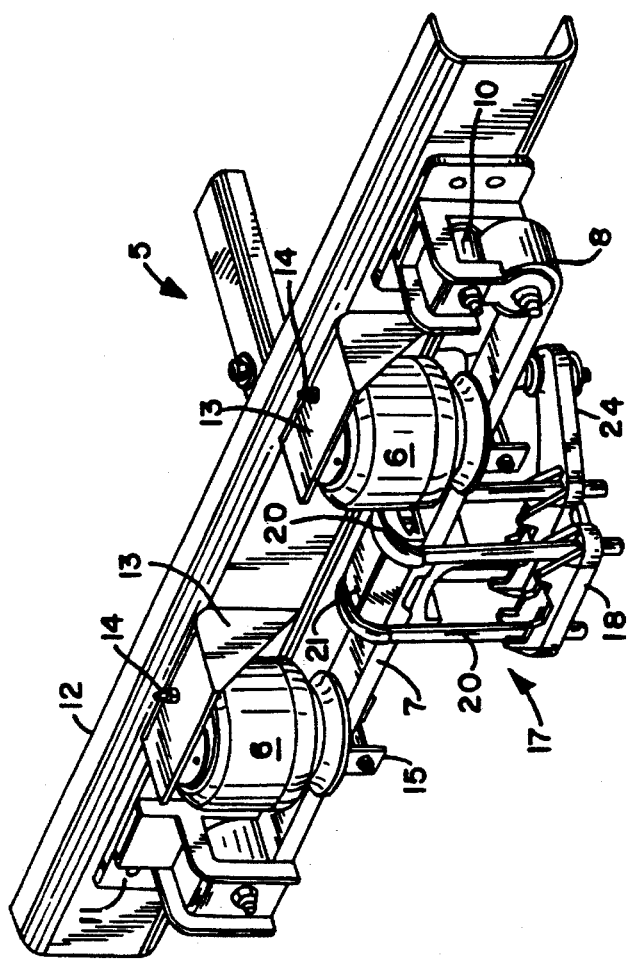
FIG. 1 is an isometric view of a suspension embodying the present invention for one side of a vehicle.

Referring to the drawings, the suspension is indicated therein generally at 5. It will be understood that this suspension is duplicated on the opposite side of the vehicle. The active or functional components of the suspension 5 comprise two air springs 6—6 and a single leaf spring 7. The single leaf spring 7 is provided with eyes 8—8 on opposite ends which are shackled to standard or existing shackle attachments 10 and 11 such as used for a leaf spring pack.

The shackle attachments or mountings 10 and 11 may have already been mounted on the fore-and-aft frame member 12 if the suspension 5 is being installed to replace an existing leaf spring pack suspension. If the suspension 5 is an original equipment suspension, then the shackle attachments 10 and 11 will be mounted in the locations where they would normally be mounted for installing a conventional leaf spring pack.

A pair of air spring support brackets 13—13 are mounted on the side of the chassis frame member 12 in locations that are fore-and-aft of the vehicle axle housing 16 (FIG. 2) and the mid-portion of the single leaf spring 7. The attachment of each air spring 6 to its support bracket 13 is achieved by way of stud 14. The lower end of each air spring 6 is attached to the single leaf spring 7 by a U-shaped clip 15.

The mid-portion of the single leaf spring 7 is attached to the adjacent end of an axle or axle housing 16 by means of a conventional axle attachment assembly indicated generally at 17. This assembly comprises a bottom plate 18 suitably apertured to receive the lower ends of shackle bolts 20—20 the bight portions of which clamp over a steel spacer 21 which rests on top of the single leaf spring 7. Preferably, the spacer 21 has grooves 22 at its opposite ends into which the bight portions of the shackles 20 fit. The vertical thickness of the spacer 21 is such as to compensate or equal the difference between the thickness of a replaced leaf spring pack and the thickness of the single leaf spring 7. Thus, the existing or standard actual attachment 17 used with a leaf spring pack can be used in the suspension 5.

A conventional shock absorber 23 and shock absorber system as used with a conventional leaf spring pack suspension may be retained or used in the suspension 5. The shock absorber 23 is shown attached to an arm 24 extending integrally from the bottom plate 18.

As mentioned above, the suspension 5 may be installed as part of the original equipment of a vehicle such as a light truck or it may be installed as a replacement for an original equipment suspension in the form of a leaf spring pack and shock absorber system.

The single leaf springs 7 (one on each side) will be of such design as to be the primary support for the load on the axle 16 when the vehicle is in its empty or unloaded condition. The four air springs 6 (two on each side) will provide the primary support for the load on the axle 16 over and above the empty weight of the vehicle. The compressed air for the air springs 6 will be supplied by an electric motor driven air compressor (not shown) in accordance with known designs.

Figure 2:
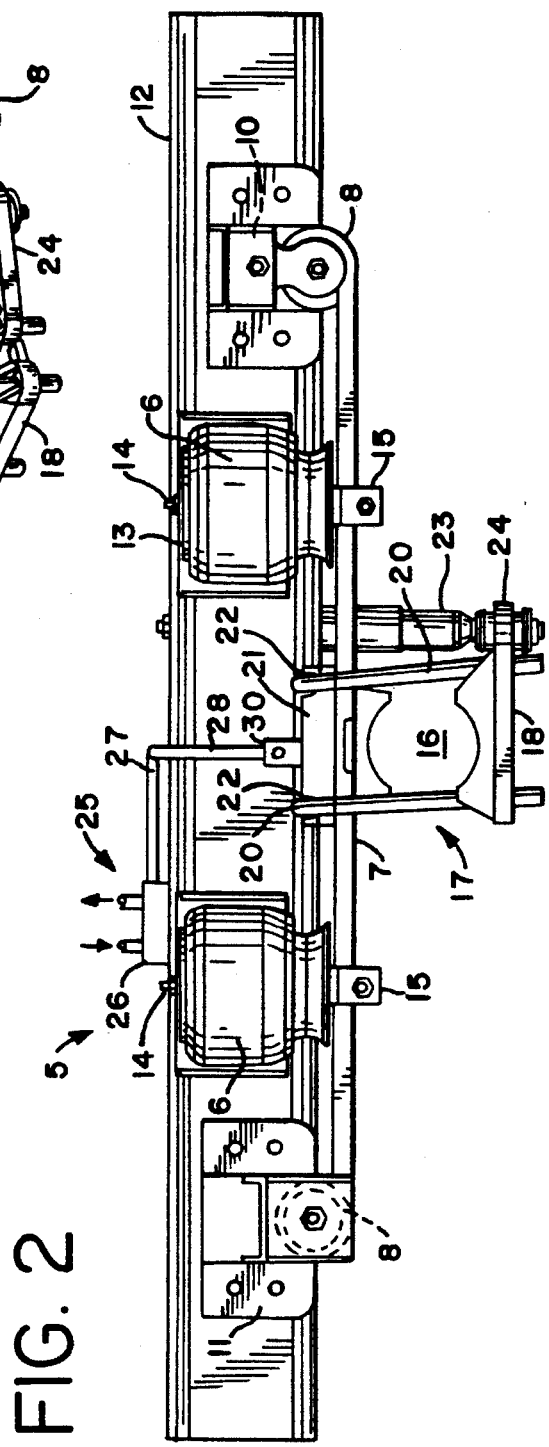
FIG. 2 is a side elevational view of the suspension of FIG. 1.

Preferably, the suspension 5 is provided with a height control system of known type which is indicated diagrammatically at 25 (FIG. 2). The system 25 comprises a leveling valve 26 of known type having an actuating lever 27 which is pivotally connected to the upper end of a link 28. The bottom end of the link is pivotally connected to a mounting bracket 30 extending from the top of the spacer 21. The system 25 (one on each side of the vehicle) operates in known manner to maintain the chassis frame member 12 at a predetermined height. This provides Q for a constant ride height and permits reduced rear wheel to fender clearance while headlight aiming becomes easier. Air is supplied to or vented from the air springs 6 by operation of the leveling valve 26 in known manner.

The components of the suspension 5 are known and already in use on suspensions in commercial use except for the single leaf spring 7 and the loaf-like spacer 21. Thus, kits for suspensions of the present invention are essentially readily available and installable at low cost making full use

What is claimed is:

1. A kit for replacing a leaf spring pack used in vehicle axle suspensions of the type combining a leaf spring pack and a shock absorber system mounted on and below a fore-and-aft extending chassis frame member on each side of a vehicle with the leaf spring pack and shock absorber system being operatively attached to the adjacent end of an axle, said kit comprising a single leaf spring having an eye at each end for attachment to the in-place vehicle frame mounts and shackle attachments as used for a leaf spring pack, a spacer to be positioned on top of said single leaf spring mid-way between its opposite ends and having a vertical thickness approximately equal to the difference between the vertical thickness of a said leaf spring pack at its mid-point and the vertical thickness of said single leaf spring at its mid-point and having a length sufficient to fit underneath and support the existing spring-to-axle attachment components which normally extend over the top of said leaf spring pack, a pair of air spring support brackets to be symmetrically mounted on said chassis frame member at fore-and-aft positions intermediate the middle of said single leaf spring and its opposite ends, a pair of air springs, first fastener means for attaching the upper end of each said air spring to one of said air spring support brackets, and second fastener means for attaching the lower end of each air spring to said single leaf spring.

2. A kit as called for in claim 1 further comprising height control means to be operatively connected directly or indirectly between a said fore-and-aft extending chassis frame member and the adjacent end of said axle for maintaining said frame member at a preselected distance above said axle.

3. A kit as called for in claim 1 wherein said single leaf spring provides the primary support for the load on said axle on one side of an associated vehicle when said vehicle is in its unloaded condition and said air springs provide the primary support for additional load on the axle on said one side when said vehicle is in its loaded condition.

4. A suspension system for supporting one side of a vehicle chassis on one end of an axle, comprising, fore-and-aft rigid leaf spring mounting means attached to a side of a fore-and-aft extending chassis side frame member, a single leaf spring attached at its opposite ends to said rigid leaf spring mounting means, axle attaching means attaching the end of an axle to said single leaf spring comprising a bottom plate engaging the underside of the axle and a pair of fore-and-aft spaced inverted U-shaped shackle bolts extending upwardly from said bottom plate with their bight portions extending over the mid-portion of said leaf spring, a spacer resting on the middle of the said single leaf spring and underneath said bight portions and spacing said bight portions a distance (d) above the middle of said single leaf spring, a pair of air spring support brackets symmetrically mounted on said chassis side frame member on opposite fore-and-aft sides of the axle, a pair of air springs suspended from said air spring support brackets and fastener means securing the lower ends of said air springs to said single leaf spring, said fore-and-aft leaf spring mounting means, said axle attaching means, said pair of air spring support brackets, said pair of air springs and said fastener means all being of the type used in a leaf spring pack suspension, and said distance d being approximately equal to the difference between the vertical thickness of the middle of a leaf spring pack and the vertical thickness of the middle of said single leaf spring.

5. The suspension called for in claim 4 wherein said spacer has grooves in its upper surface in which said bight portions are seated.

6. The suspension of claim 4 including a shock absorber system operatively interconnected between said bottom plate and said chassis side frame member and being of the type used in leaf spring pack suspensions.

7. The suspension called for in claim 6 including a height control system operatively interconnected between said chassis side frame member and said axle for maintaining said side frame member at a predetermined distance above said axle and being of the type used in leaf spring pack suspensions.

8. The suspension of claim 4 wherein a pair of said single leaf springs provides the primary support for the load on said axle when an associated vehicle is not loaded and said air springs provide the primary support for additional load on the axle.

* * * * *